Figure 1:
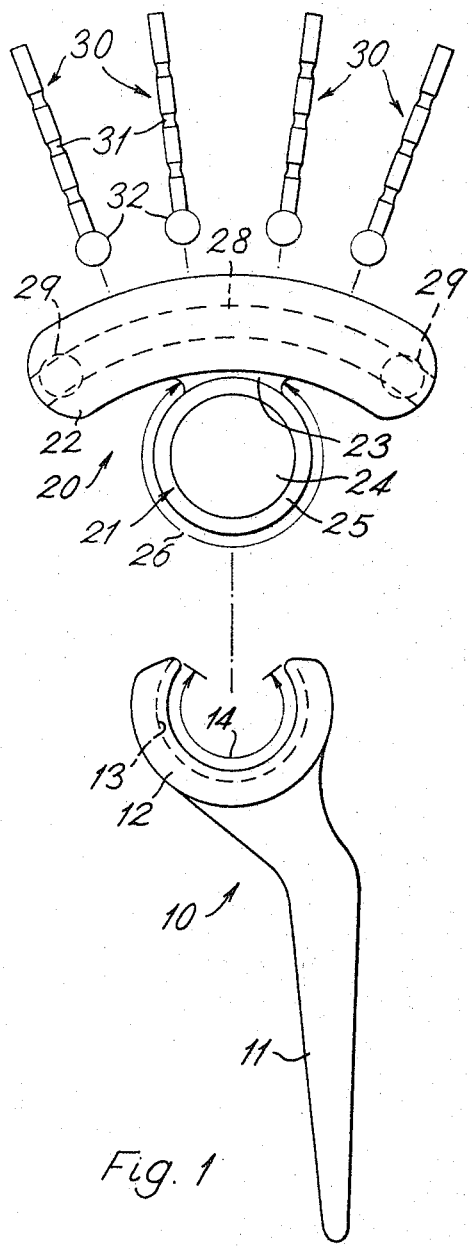

United States Patent [19]
Lennox

[11] 3,909,853
[45] Oct. 7, 1975

[54] ENDOPROSTHETIC WRIST JOINT

[75] Inventor: William Murdoch Lennox, Cheltenham, England

[73] Assignee: National Research Development Corporation, London, England

[22] Filed: May 15, 1974

[21] Appl. No.: 470,292

[30] Foreign Application Priority Data
May 22, 1973 United Kingdom............... 24406/73

[52] U.S. Cl.................... 3/1.91; 128/92 C; 3/12.4
[51] Int. Cl.² ........................................... A61F 1/24
[58] Field of Search .......... 3/1, 12, 12.4, 12.5, 12.6, 3/12.7, 1.9, 1.91; 128/92 C, 92 CA, 92 R

[56] References Cited
UNITED STATES PATENTS
| | | | |
|---|---|---|---|
| 2,422,302 | 6/1947 | Horn | 3/12.4 |
| 3,651,521 | 3/1972 | Devas | 3/1 |
| 3,688,316 | 9/1972 | Lagrange et al. | 3/1 |
| 3,795,922 | 3/1974 | Herbert et al. | 3/1 |

*Primary Examiner*—Ronald L. Frinks
*Attorney, Agent, or Firm*—Cushman, Darby & Cushman

[57] ABSTRACT

An endoprosthetic wrist joint device is provided having: a radial component formed by a tapered intramedullary stem with a part-annular, spherically-shaped socket at its wider end; a carpal component including a spherical ball with opposed flats allowing free entry into the radial socket for captive articulatory engagement therewith when twisted, and an elongated member joined to the ball by a neck to form a T-shape, such member having a longitudinal slot remote from the ball and of circular arcuate cross-section; and a plurality of metacarpal components each including a spherical ball slid into the slot and having a pin stem extending from the ball out of the slot.

9 Claims, 4 Drawing Figures

ENDOPROSTHETIC WRIST JOINT

Endoprosthetic devices have been proposed, and indeed find increasing use for replacing the articular function of various anatomical joints in the human body, but no such device appears to have been proposed for the wrist joint. This omission probably arises from the fact that the joints which have so far been the subject of endoprosthetic proposals are relatively simple in comprising two or three bones and the associated proposals have normally involved two-part devices providing what can be a singular or integrated articular capability. In comparison, the wrist joint is relatively more complex in comprising a greater number of bones which co-operate to provide a plurality of distributed articular capabilities.

In so far as the wrist joint is regarded as being one of the more likely joints to be affected by an arthritic condition which reduces articular function, and that when such a condition occurs it normally affects the whole of the wrist joint and the utility of the relevant hand, there is clearly benefit to be gained by considering the possibility of an endoprosthetic wrist joint device.

The present invention represents the result of such a consideration and, in a more general aspect, provides an endoprosthetic wrist joint device comprising: a radial component having a fixation part adapted for securement with the radius, and a bearing part; a carpal component having a first bearing part adapted with said radial component bearing part for mutual articulatory bearing engagement, and a second bearing part; and a plurality of metacarpal components, each having a fixation part adapted for securement with an individual metacarpal, and each having a bearing part adapted with said carpal component bearing part for individual mutual articulatory bearing engagement.

For a clearer understanding of the present invention, the same will now be more fully described, by way of example, with reference to the accompanying drawings, in which:-

Figure 2:
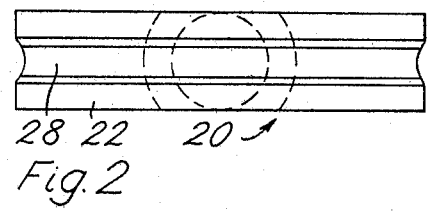
Figure 3:
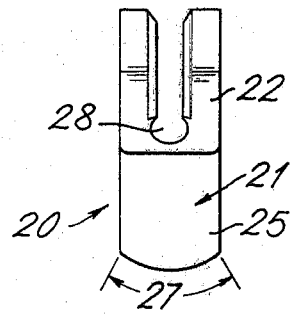
Figure 4:
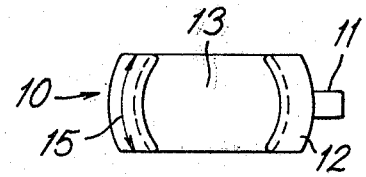

FIG. 1 illustrates one embodiment of a device according to the invention in an exploded side view;

FIGS. 2 and 3 respectively illustrate the carpal component of FIG. 1 in an end and orthogonal side view; and FIG. 4 illustrates the radial component of FIG. 1 in an end view.

The illustrated device is seen in FIG. 1 in an orthogonal direction relative to the palm of the hand and comprises a radial component 10, a carpal component 20, and four like metacarpal components 30.

The radial component 10 has a fixation part in the form of a tapered intramedullary stem 11 and a bearing part 12 of generally U-shape integrally connected at its base with the wider end portions of the stem 10 to form an overall Y-shaped configuration. The bearing part 12 is in fact substantially symmetrical about a vertical axis as seen in FIG. 1, but the stem 11 joins the bearing part 12 in an effectively off-set manner. More particularly, the bearing part 12 is formed with its inner surface relative to the U-shaping as a symmetrical, part-annular, concave, spherically-segmental bearing surface 13.

The carpel component 20 has first and second bearing parts respectively denoted at 21 and 22, which parts are integrally connected by a necked part 23. The first bearing part 21 has the shape of a spherical ball formed with two diametrally-opposed like flats 24 and the necked part extends in symmetrical manner from the remanent spherical surface 25 so that this surface is of symmetrical, part-annular, convex, spherically-segmental shape. It is to be noted that this shape is similar to that of the radial component bearing surface 13 except that they are respectively convex and concave. In fact these surfaces are formed to like spherical radii to serve as complementary bearing surfaces, although they are not identical in all respects. More particularly in this last respect, the angular extent 14 circumferentially around the part-annulus of the surface 13 is less than the corresponding extent 26 of the surface 25, but greater than 180°, and the respective angular extents 15 and 27 in an orthogonal sense around these surfaces should not total more than 180° when summed.

The second bearing part 22 of the carpal component is in the form of a member which is integrally connected with the other end of the necked part 23 from the first bearing part 21 to provide with the necked part a general T-shape of which the part 22 is the bar and the part 23 the stem. The upper edge of the second bearing part member 22 is longitudinally convexly curved and formed with an open-ended slot 28 extending wholly longitudinally therealong. The slot 28 has a uniform circular-arcuate cross-sectional shape along its length, which shape subtends an angle greater than 180°, and serves as a second bearing surface for the carpal component.

The metacarpal components 30 each comprise a fixation part in the form of an intramedullary pin 31 terminating at one end in a bearing part in the form of a spherical ball 32 integrally connected with the pin. The ball 32 has substantially equal radius with the cross-sectional shape of the carpal component slot 28 so that these formations serve as complementary bearing surfaces, and the maximum diametral dimension of the pin 31 adjacent its ball will be less than the width of the slot mouth.

Lastly in relation to the construction of the illustrated device, the presently preferred choice of materials is metal, such as an appropriate cobalt-chromium-molybdenum alloy, for the radial and metacarpal components, and a plastics material, such as high density polyethylene, for the carpal component.

In use of the illustrated device the stem 11 and the pins 30 are respectively secured in the medullary canals of the radius and individual metacarpals with acrylic cement or equivalent gap-filling medium. In this connection it is to be noted that the mutual inclination between the stem 11 and its bearing part 12 is employed to afford an appropriate lateral inclination in the anatomical sense relative to the radius dependent on whether a left or right hand wrist joint articulatory function is being replaced. However, this last point does not imply a necessity to provide specific left and right hand forms for the carpal component since, as will be appreciated hereinafter, the illustrated component is reversible in this sense.

Regarding assembly of the components to provide articulatory function: the more general relationship between the various bearing parts has been indicated above by the reference to complementary bearing surfaces.

Thus the radial component bearing part 12 is assembled with the carpal component first bearing part 21 to bring their respective bearing surfaces 13 and 25 into mutual articulating relationship. This assembly is effected by bringing the relevant bearing parts together, longitudinally, laterally, or obliquely, with one of the components turned through 90° relative to their common longitudinal direction as seen in FIG. 1. When the components are engaged in this way, a further such 90° rotation of one of them renders the bearing parts captively engaged. The resultant assembly articulates in the manner of a ball-and-socket joint, although the range of articulation which is possible while the components remain captively engaged is, of course, limited. However, this situation is not disadvantageous but deliberately chosen to afford simulation of the articulatory capability of the natural radiocarpal joint within these limitations, while the capability for separation of the bearing parts allows the parts to be engaged during implantation when the natural joint capsule is opened. The articulatory capability of the natural radiocarpal joint involves two basic components, namely, ulnar and radial deviation, and palmar and dorsiflexion, these being respectively simulated by mutual rotation of the bearing parts about the common diameter orthogonal to the plane of FIG. 1, and such rotation about the common diameter in the plane of FIG. 1 perpendicular to the longitudinal direction. The articulatory capability of these components also takes account of the circumductory contribution of the natural intracarpal movements.

Turning to assembly of the bearing parts of the metacarpal components and the carpal component second bearing part, the relevant balls 32 are brought into mutual bearing engagement with the slot 28 by successively sliding each of the former into an open end of the latter. Again, the resultant assemblies each articulate in the manner of a ball-and-socket joint, and also have a relative sliding capability longitudinally along the slot. The articulating capability is, of course, limited at least orthogonally to the plane of FIG. 1 by engagement of the relevant pin with the rim of the slot, which rim may be inwardly convergently tapered as shown in FIG. 3, and both the articulating and sliding capabilities are limited by the presence of at least one neighbouring metacarpal component. Also, it will normally be appropriate to close the ends of the slot after introduction of the balls, this closure being effected in any suitable manner such as by use of self-tapping screws denoted in broken outline at 29 in FIG. 1. However, these limitations still allow adequate simulation of the articulation of the natural carpometacarpal joint, the latter being very slight and serving simply to allow compliance in the palm of the hand. The articulating capability of the metacarpal components in the plane of FIG. 1, and also the sliding capability of such components, is in fact particularly useful in providing an adjustment capability in a single device to suit use in a range of hand sizes.

While the invention has been described with more particular reference to the illustrated embodiment, this embodiment represents only a presently preferred form of the invention and can be modified within the broader scope of the invention as initially discussed. For example, while the described radial-carpal component assembly is simple in being of two-part separable form, other arrangements such as employing a locking ring to afford captive engagement of a ball-and-socket joint can be employed. Similarly, the carpal-metacarpal joint assembly need not be of the described multiple ball-single slot form, but could involve the provision of individual assemblies similar to that of the described radial-carpal assembly. Indeed, the mechanism of the radial-carpal assembly may well form the basis of an individual radio-carpal, carpal-metacarpal, metacarpal-phalangeal, or other bone joint prosthesis. Also, while the radial-carpal assembly further simulates the natural radio-carpal joint in their allocations of the ball-and-socket configurations between the components, this allocation can be reversed in the present instance, and a similar reversal is possible in respect of other forms of the carpal-metacarpal assemblies. As a further example of possible modification, it is to be noted that no provision is made in the illustrated device for direct involvement of the thumb. However, such provision can clearly be made by way of an additional, appropriately located ball-and-socket assembly between the carpal component and a further 'metacarpal' component for securement in the greater multangulum of the thumb.

I claim:

1. In an endoprosthetic wrist joint device including:
   a first component having a stem terminating at one end in a bearing part;
   a second component having a first bearing part engageable with the bearing part of said first component in a mutually articulatory manner, and having a second bearing part; and
   a plurality of similar third components each having a stem terminating at one end in a bearing part engageable with the second bearing part of said second component in an individual mutually articulatory manner;
   the method of providing an endoprosthetic wrist joint function which method comprises:
   securing the stem of said first component in the radius bone,
   securing said third component stems in respectively individual metacarpal bones,
   substituting said second component for carpal bones, and
   locating said second component to bring said first and second bearing parts respectively into said mutually articulatory engagements with said first and third component bearing parts.

2. An endoprosthetic wrist joint device comprising:
   a radial component having a fixation part for securement with the radius, and a bearing part;
   a carpal component having a first bearing part connected with said radial bearing part in mutually articulatory ball-and-socket bearing engagement, and a second bearing part in the form of an open-ended elongated slot having a uniform circular arcuate cross-sectional shape; and
   a plurality of metacarpal components each having a fixation part for securement to a respectively individual metacarpal, and each having a bearing part defining a convex spherically shaped surface located in said slot from one end thereof to provide individual ball-and-socket mutually articulatory bearing engagement.

3. A device according to claim 2 wherein:
   said radial bearing part and said carpal first bearing part define mutually complementary convex and concave bearing surfaces of symmetrical, part-annular, spherically-segmental shape;
   said concave shape subtends in its annular plane an angle at its spherical centre less than the companion angle of said convex shape, but greater than 180°;

and said concave and convex shapes subtend respective companion angles at their spherical centres, in directions perpendicular to their annular planes, which respective angles total not more than 180° when summed.

4. A device according to claim 3 wherein said radial bearing part and said carpal first bearing part respectively define said concave and convex surfaces.

5. An endoprosthetic wrist joint device comprising:

a radial component having a fixation part for securement with the radius, and a bearing part;

a generally T-shaped carpal component having a first bearing part connected with said radial bearing part in mutually articulatory ball-and-socket bearing engagement, a necked part extending from said first bearing part, and an elongated second bearing part connected at an intermediate location therealong to said necked part and extending transversely relative to said necked part; and a plurality of metacarpal components each having a fixation part for securement to a respectively individual metacarpal, and each having a bearing part connected with said second bearing part in individual mutually articulatory ball-and-socket bearing engagement.

6. An endoprosthetic wrist joint device comprising:

a radial component having a bearing part and a fixation part for securement with the radius, which fixation part is in the form of an elongated tapered stem longitudinally extending, at its wider end, from said bearing part in transversely off-set manner;

a carpal component having a first bearing part connected with said radial bearing part in mutually articulatory ball-and-socket bearing engagement, and a second bearing part; and a plurality of metacarpal components each having a fixation part for securement to a respectively individual metacarpal, and each having a bearing part connected with said carpal second bearing part in individual mutually articulatory ball-and-socket bearing engagement.

7. An endoprosthetic bone joint device comprising:

first and second components having respective first and second bearing parts connected in mutually articulatory ball-and-socket bearing engagement;

said bearing parts respectively defining mutually complementary convex ball and concave socket bearing surfaces of symmetrical, part-annular, spherically-segmental shape;

said concave shape subtending in its annular plane an angle at its spherical centre less than the companion angle of said convex shape but greater than 180°; and said convex and concave shapes subtending respective companion angles at their spherical centres, in directions perpendicular to their annular planes, which respective angles total not more than 180° when summed.

8. An endoprosthetic bone joint device comprising:

a first component having a bearing part defining a bearing surface in the form of an open-ended elongate slot having uniform arcuate cross-sectional shape subtending an angle at its centre greater than 180°;

a plurality of second components each including a bearing part in the form of a ball and a fixation part in the form of a stem projecting from said ball;

each said ball being slidably received in said slot from one end thereof, with the respective stem extending through said slot in captive mutually articulatory engagement.

9. A device according to claim 8 wherein said slot is longitudinally convexly curved and has an opening portion leading to said arcuate cross-sectional shape, which portion is inwardly convergently tapered.

* * * * *